US012654746B2

(12) United States Patent　　(10) Patent No.:　US 12,654,746 B2

Nasr et al.　　(45) Date of Patent:　Jun. 16, 2026

(54) METHOD AND A SYSTEM FOR RUN-TIME OPERATIONAL MONITORING OF AN AUTONOMOUS VEHICLE

(71) Applicant: Yinwang Intelligent Technologies Co., Ltd., Shenzhen (CN)

(72) Inventors: Ali Nasr, Waterloo (CA); Frederic Risacher, Kitchener (CA)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/823,001

(22) Filed: Sep. 3, 2024

(65) Prior Publication Data

US 2026/0062033 A1　　Mar. 5, 2026

(51) Int. Cl.
*B60W 60/00*　　(2020.01)
*B60W 50/14*　　(2020.01)

(52) U.S. Cl.
CPC ........ *B60W 60/0015* (2020.02); *B60W 50/14* (2013.01); *B60W 60/0053* (2020.02); *B60W 2420/403* (2013.01); *B60W 2420/408* (2024.01); *B60W 2556/40* (2020.02); *B60W 2556/50* (2020.02)

(58) Field of Classification Search
CPC ............. B60W 60/0015; B60W 50/14; B60W 60/0053; B60W 2420/403; B60W 2420/408; B60W 2556/40; B60W 2556/50
See application file for complete search history.

(56) References Cited

U.S. PATENT DOCUMENTS

| | | | |
|---|---|---|---|
| 10,262,741 | B2 | 4/2019 | Xie |
| 10,710,602 | B2 | 7/2020 | Goldberg |
| 11,008,000 | B2 | 5/2021 | Chang et al. |
| 11,327,501 | B1 | 5/2022 | Ferguson et al. |

(Continued)

FOREIGN PATENT DOCUMENTS

| | | |
|---|---|---|
| CN | 114326653 A | 4/2022 |
| CN | 117932921 A | 4/2024 |

OTHER PUBLICATIONS

Zhou et al., "Objects as Points," arXiv:1904.07850v2 [cs.CV], total 12 pages (Apr. 25, 2019).

*Primary Examiner* — Nhi Q Bui

(74) *Attorney, Agent, or Firm* — Leydig, Voit & Mayer, Ltd.

(57)　　　　ABSTRACT

A method and system for controlling a vehicle are provided. The method comprises: in parallel to a first processing pipeline for controlling the vehicle, executing a risk management processing pipeline comprising: acquiring first monitoring data from a first monitoring source used in first processing pipeline; acquiring second monitoring data from a second monitoring source used in the first processing pipeline; generating a cumulative risk assessment value based on a combination of the first monitoring data and the second monitoring data; in response to the cumulative risk assessment value being above a pre-determined main threshold, generating a warning notification; and in response to a frequency of occurrence of the generating the warning notification being above a pre-determined frequency threshold, triggering, independently from the first processing pipeline, a remedial action to be performed by the vehicle. The present technology may allow increasing safety of operation of the vehicle.

20 Claims, 5 Drawing Sheets

(56) References Cited

U.S. PATENT DOCUMENTS

| | | | |
|---|---|---|---|
| 11,872,999 B2 | 1/2024 | She et al. | |
| 2017/0234689 A1* | 8/2017 | Gibson | G05D 1/0061 |
| | | | 701/25 |
| 2019/0056731 A1* | 2/2019 | Westbrook | B60W 60/0059 |
| 2019/0204829 A1* | 7/2019 | Kuo | B60W 30/095 |
| 2021/0179131 A1* | 6/2021 | Maeda | B60W 30/18 |
| 2023/0192147 A1* | 6/2023 | Raina | G01C 21/3804 |
| | | | 701/23 |
| 2024/0409109 A1* | 12/2024 | Chen | G06V 20/597 |

* cited by examiner 400, 10

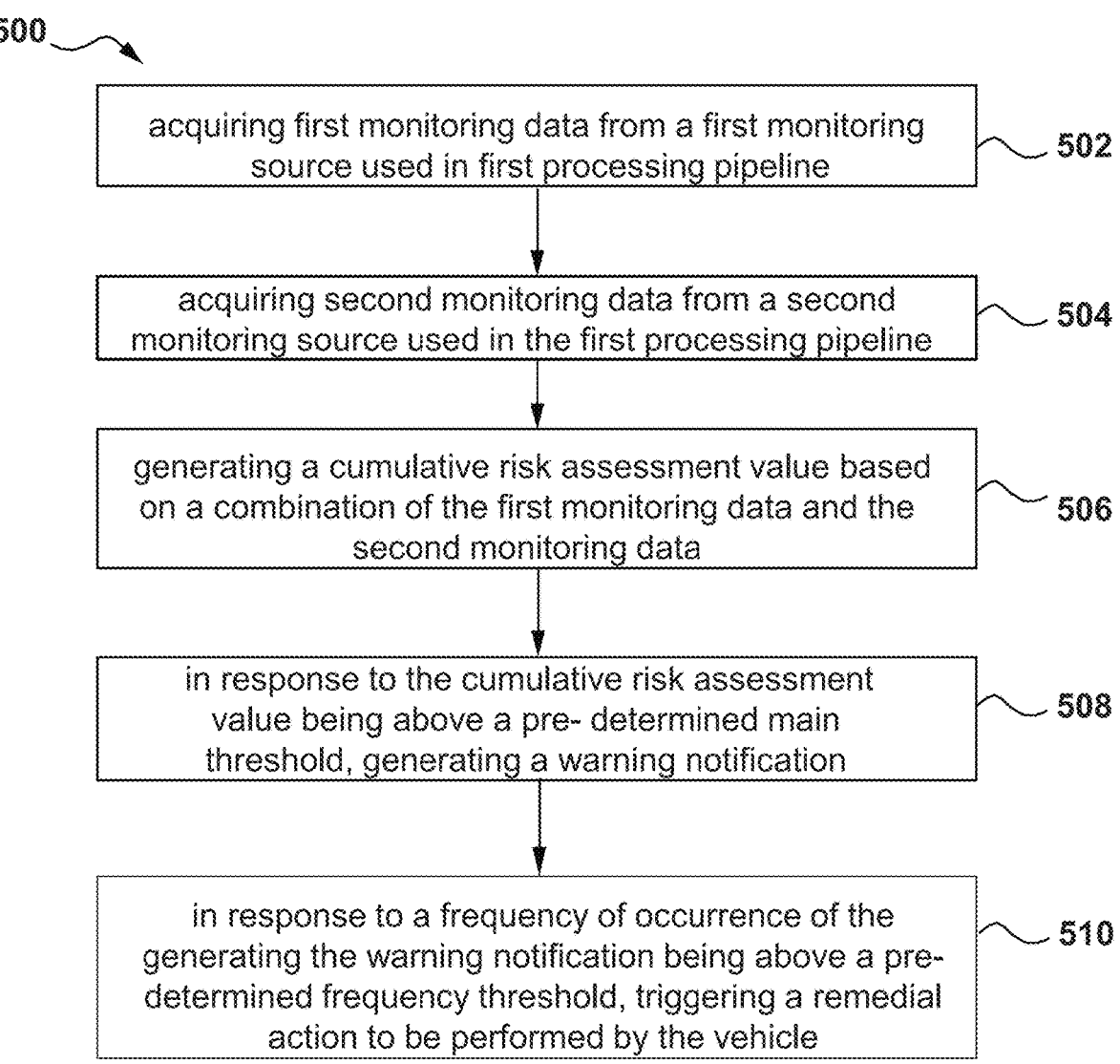

500 acquiring first monitoring data from a first monitoring source used in first processing pipeline — 502 acquiring second monitoring data from a second monitoring source used in the first processing pipeline — 504 generating a cumulative risk assessment value based on a combination of the first monitoring data and the second monitoring data — 506 in response to the cumulative risk assessment value being above a pre- determined main threshold, generating a warning notification — 508 in response to a frequency of occurrence of the generating the warning notification being above a pre-determined frequency threshold, triggering a remedial action to be performed by the vehicle — 510

*FIG. 5*

METHOD AND A SYSTEM FOR RUN-TIME OPERATIONAL MONITORING OF AN AUTONOMOUS VEHICLE

FIELD

The present technology relates broadly to safety monitoring systems; and more specifically, to a method and a system run-time operational monitoring of an autonomous vehicle.

BACKGROUND

The burgeoning deployment of autonomous vehicles, such as self-driving cars, delivery and warehouse robots, and drones, has underscored the critical imperative of run-time assurance. Typically, such vehicles include electronic devices configured to execute an autonomous driving pipeline. The autonomous driving pipeline comprises multiple learning-enabled and non-learning enabled components configured to control the operation of a given autonomous vehicle based on data sensed by imaging sensors installed within the given autonomous vehicle.

As these components of the autonomous driving pipeline are akin to black boxes, outputs of which can generally be influenced by diverse and dynamically changing environments, the traditional paradigms of pre-deployment verification and validation of each of these components and imaging sensors alone may be insufficient in ensuring their safety, reliability, and optimal performance.

Thus, there is a need in the art for developing systems and methods for run-time operational monitoring and adaptive control mechanisms for the components of the autonomous driving pipeline.

Certain prior art approaches have been proposed to tackle the above-identified technical problem.

U.S. Pat. No. 10,262,471-B2, issued on Apr. 16, 2019, assigned to Uatc LLC, and entitled "AUTONOMOUS VEHICLE DEGRADATION LEVEL MONITORING," discloses an on-trip monitoring system for an on-demand transportation service can monitor live log data from autonomous vehicles (AVs) operating throughout a given region. The system can determine a degradation level for a respective AV based on the live log data, and when the degradation level exceeds a determined threshold, the system can transmit an update command to the respective AV to service or decommission the respective AV.

U.S. Pat. No. 11,327,501-B1, issued on May 10, 2022, assigned to Waymo LLC, and entitled "DETECTING SENSOR DEGRADATION BY ACTIVELY CONTROLLING AN AUTONOMOUS VEHICLE," discloses methods and systems for determining sensor degradation by actively controlling an autonomous vehicle. Determining sensor degradation may include obtaining sensor readings from a sensor of an autonomous vehicle, and determining baseline state information from the obtained sensor readings. A movement characteristic of the autonomous vehicle, such as speed or position, may then be changed. The sensor may then obtain additional sensor readings, and second state information may be determined from these additional sensor readings. Expected state information may be determined from the baseline state information and the change in the movement characteristic of the autonomous vehicle. A comparison of the expected state information and the second state information may then be performed. Based on this comparison, a determination may be made as to whether the sensor has degraded.

U.S. Pat. No. 11,008,000-B2, issued on May 18, 2021, assigned to Motional AD LLC, and entitled "RISK PROCESSING FOR VEHICLES HAVING AUTONOMOUS DRIVING CAPABILITIES," discloses identifying risk associated with operating the vehicle based on sensor signals of a vehicle comprising an autonomous driving capability. The autonomous driving capability is modified in response to the risk. The operation of the vehicle is updated based on the modifying of the autonomous capability.

U.S. Pat. No. 10,710,602-B2, issued on Jul. 14, 2020, assigned to Uatc LLC, and entitled "SYSTEMS AND METHODS FOR A VEHICLE CONTROLLER SAFETY MONITOR," discloses systems and methods for monitoring the status of a vehicle controller or other autonomy system during operation of an autonomous vehicle. In one example, the methods include obtaining a message from a vehicle controller. The methods further include, based at least partly on the message, determining whether a failure mode exists. The methods further include providing, in response to determining the failure mode exists, one or more commands to implement a safety measure response for the autonomous vehicle.

U.S. Pat. No. 11,872,999-B2, issued on Jan. 16, 2024, assigned to Huawei Technologies Co Ltd, and entitled "SELF-DRIVING SAFETY EVALUATION METHOD, APPARATUS, AND SYSTEM," discloses a self-driving safety evaluation method, including determining RB based on a risk value of a vehicle in a shadow driving mode in a first measurement unit, where $R_B$ is a risk value of the vehicle in the shadow driving mode in a plurality of measurement units, and determining $R_C$ based on a risk value of the vehicle in a self-driving mode based on a pre-set route in the first measurement unit, where $R_C$ is a risk value of the vehicle in the self-driving mode based on the pre-set route in the measurement units, where $R_B$ and $R_C$ are used to determine whether safety of the vehicle in the self-driving mode meets a requirement.

SUMMARY

It is an object of the present technology to ameliorate at least one inconvenience associated with the prior art.

Embodiments of the present technology are directed to a more holistic approach to run-time operational monitoring of the components of the autonomous driving pipeline. More specifically, the methods and systems disclosed herein are directed to using multiple monitoring parameters for evaluating the operational safety of the given autonomous vehicle. In at least some non-limiting embodiments of the present technology, these multiple monitoring parameters can be indicative of both (1) connection statuses of the imaging sensors of the vehicle and (2) consistency of outputs of each component of the autonomous driving pipeline of the autonomous vehicle. The latter may be achieved by comparing the outputs of certain components of the autonomous driving pipeline, such as those of a camera object tracking component and a lidar object tracking component that are configured to generate their outputs based on readings from camera and lidar sensors, respectively. For example, if the outputs of the camera and lidar object tracking components are representative of dissimilar objects and/or their motion characteristics, it may be indicative of malfunctioning of at least one of the camera and lidar sensors. Thus, by cross comparing the outputs of both learning-enabled and non-learning enabled components of the autonomous driving pipeline, certain non-limiting embodiments of the present technology may allow more effectively identifying failures of the components and take remedial actions in a timely manner.

Also, in some non-limiting embodiments of the present technology, the current values of the monitoring parameters can be dynamically adjusted based on external factors influencing the movement of the given autonomous vehicle, such as weather or traffic patterns. More specifically, the adjusting can include assigning to the outputs of each of the components of the autonomous driving pipeline respective severity levels. For example, a respective severity level of the output of the lidar object tracking component can be increased during the rain as the confidence level of readings of the lidar sensor during this weather tends to decrease. By doing so, the present methods and system may allow for adaptability of the run-time monitoring of the components of the autonomous driving pipeline, which may allow more adequately conducting the risk assessment of the autonomous driving pipeline under various external factors. This may allow for even greater increase of operational safety of the autonomous vehicle.

Overall, the present technology could be used for monitoring various parameters in intelligent autonomous mobile systems, such as vehicles, robots, aviation, and marine systems. At least some non-limiting embodiments of the present technology allow encompassing the monitoring of sensor connections, computation resources, reliability, consistency, overlap of perception, prediction, and planning components/modules, as well as the spatial or temporal proximity of perceived objects. Additionally, the present technology may involve accumulative risk assessment based on the values from the monitoring section. Furthermore, in at least some non-limiting embodiments of the present technology, the methods and systems described herein may include taking recovery actions such as alerting safety violations, sensor fusion adjustments, learning-enabled model switching, slowing down the mobile system, implementing temporary recovery actions, take-over mechanisms, compiling reports, and any other possible recovery actions in response to safety violations.

More specifically, in accordance with a first broad aspect of the present technology, there is provided a computer-implementable method for controlling a vehicle. The method comprises: executing a first processing pipeline, including triggering control over the vehicle. Further, the method comprises executing, in parallel to the first processing pipeline, a risk management processing pipeline. The risk management processing pipeline comprises: acquiring first monitoring data from a first monitoring source used in the first processing pipeline; acquiring second monitoring data from a second monitoring source used in the first processing pipeline; generating a cumulative risk assessment value based on a combination of the first monitoring data and the second monitoring data; in response to the cumulative risk assessment value being above a pre-determined main threshold, generating a warning notification; and in response to a frequency of occurrence of the generating the warning notification being above a pre-determined frequency threshold, triggering, independently from the first processing pipeline, a remedial action to be performed by the vehicle.

In some implementations of the method, the method further comprises: acquiring external factor data indicative of external factors influencing at least one of the first monitoring data and the second monitoring data; generating, for the at least one of the first and second monitoring data, a respective severity level based on the external factor data;

and using the respective severity level for generating the cumulative risk assessment value.

In some implementations of the method, the external factors comprise at least one of a current weather condition, a current traffic situation, a current environment of the vehicle, an ego-speed of the vehicle, and a current time of day.

In some implementations of the method, the generating the cumulative risk assessment value comprises generating the cumulative risk assessment value according with a following equation:

$$R = \sum (F \times S),$$

where F is a respective frequency value one of the first and second monitoring data exceeding a respective threshold value; and S is the respective severity level associated with the one of the first and second monitoring data.

In some implementations of the method, a given one of the first and second monitoring sources comprises one of a hardware component of a plurality of hardware components, a learning-enabled component (LEC) of a plurality of LECs, and a non-learning-enabled component (NLEC) of a plurality of NLECs of the vehicle that are used in the first processing pipeline for controlling the vehicle.

In some implementations of the method, the plurality of hardware components comprises a plurality of sensors of the vehicle and an electronic device communicatively coupled thereto, the plurality of sensors comprising: a camera sensor; LIDAR senor; a RADAR sensor; a Global Positioning System (GPS) sensor; and an Inertial Measurement Unit (IMU) sensor; and the electronic device comprising: a processor; a read-access memory (RAM); and a CAN-bus.

In some implementations of the method, the plurality of LECs comprises: a camera object detection or tracking machine-learning (ML) model; a LIDAR object detection or tracking ML model; a RADAR object detection or tracking ML model; a lane line detecting ML model; a traffic light recognizing ML model; and a trajectory predicting ML model.

In some implementations of the method, the plurality of NLECs comprises: a trajectory planning model; an object tracking model; a global localization model; and a high definition (HD) map.

In some implementations of the method, the given one of the first and second monitoring data is indicative of at least one of: a connection status of each one of the plurality of hardware components; a confidence level of a respective output of each one of the plurality of LECs; consistency among respective outputs of the plurality of LECs and the plurality of NLECs; a smoothness of a current trajectory traversed by the vehicle; and a spatial and temporal proximity of the vehicle to at least one object in the surrounding area.

In some implementations of the method, the remedial action comprises at least one of generating a safety alert, handing over control of the vehicle to a human driver present in the vehicle, stopping the vehicle, and logging the events occurring in the first processing pipeline.

In accordance with a second broad aspect of the present technology, there is provided a system for controlling a vehicle. The system comprises at least one processor, at least one non-transitory computer-readable memory storing instructions, which, when executed by the at least one processor, cause the system to: execute a first processing pipeline, including triggering control over the vehicle. Further, the instructions cause the system to execute, in parallel to the first processing pipeline, a risk management processing pipeline. The risk management processing pipeline comprises: acquiring first monitoring data from a first monitoring source used in the first processing pipeline; acquiring second monitoring data from a second monitoring source used in the first processing pipeline; generating a cumulative risk assessment value based on a combination of the first monitoring data and the second monitoring data; in response to the cumulative risk assessment value being above a pre-determined main threshold, generating a warning notification; and in response to a frequency of occurrence of the generating the warning notification being above a pre-determined frequency threshold, triggering, independently from the first processing pipeline, a remedial action to be performed by the vehicle.

In some implementations of the system, the instructions further cause the system to:

acquire external factor data indicative of external factors influencing at least one of the first monitoring data and the second monitoring data; generate, for the at least one of the first and second monitoring data, a respective severity level based on the external factor data; and use the respective severity level for generating the cumulative risk assessment value.

In some implementations of the method, the external factors comprise at least one of a current weather condition, a current traffic situation, a current environment of the vehicle, an ego-speed of the vehicle, and a current time of day.

In some implementations of the system, to generate the cumulative risk assessment value, the instructions cause the system to generate the cumulative risk assessment value according with a following equation:

$$R = \sum (F \times S),$$

where F is a respective frequency value one of the first and second monitoring data exceeding a respective threshold value; and S is the respective severity level associated with the one of the first and second monitoring data.

In some implementations of the system, a given one of the first and second monitoring sources comprises one of a hardware component of a plurality of hardware components, a learning-enabled component (LEC) of a plurality of LECs, and a non-learning-enabled component (NLEC) of a plurality of NLECs of the vehicle that are used in the first processing pipeline for controlling the vehicle.

In some implementations of the system, the plurality of hardware components comprises a plurality of sensors of the vehicle and an electronic device communicatively coupled thereto, the plurality of sensors comprising a camera sensor; a LIDAR senor; a RADAR sensor; a Global Positioning System (GPS) sensor; and an Inertial Measurement Unit (IMU) sensor; and the electronic device comprising: a processor; a read-access memory (RAM); and a CAN-bus.

In some implementations of the system, the plurality of LECs comprises: a camera object detection or tracking machine-learning (ML) model; a LIDAR object detection or tracking ML model; a RADAR object detection or tracking ML model; a lane line detecting ML model; a traffic light recognizing ML model; and a trajectory predicting ML model.

In some implementations of the system, the plurality of NLECs comprises: a trajectory planning model; an object tracking model; a global localization model; and a high definition (HD) map.

In some implementations of the system, the given one of the first and second monitoring data is indicative of at least one of: a connection status of each one of the plurality of hardware components; a confidence level of a respective output of each one of the plurality of LECs; consistency among respective outputs of the plurality of LECs and the plurality of NLECs; a smoothness of a current trajectory traversed by the vehicle; and a spatial and temporal proximity of the vehicle to at least one object in the surrounding area.

In accordance with a third broad aspect of the present technology, there is provided a computer-readable medium storing executable instructions for causing one or more computer processors to: execute a first processing pipeline, including triggering control over the vehicle. Further, the executable instructions cause the one or more computer processors to execute, in parallel to the first processing pipeline, a risk management processing pipeline. The risk management processing pipeline comprises: acquiring first monitoring data from a first monitoring source used in the first processing pipeline; acquiring second monitoring data from a second monitoring source used in the first processing pipeline; generating a cumulative risk assessment value based on a combination of the first monitoring data and the second monitoring data; in response to the cumulative risk assessment value being above a pre-determined main threshold, generating a warning notification; and in response to a frequency of occurrence of the generating the warning notification being above a pre-determined frequency threshold, triggering, independently from the first processing pipeline, a remedial action to be performed by the vehicle.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein. It is contemplated that the user device and the server can be implemented as a same single entity.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context), firmware, hardware, or a combination thereof, that is both necessary and sufficient to achieve the specific function(s) being referenced.

In the context of the present specification, the term "run-time" refers to the period of program execution, such as that of the autonomous driving pipeline of a given autonomous vehicle.

In the context of the present specification, the expression "computer usable information storage medium" or "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "data domain" denotes broadly a collection of values that a data element may include in a particular setting. For example, if the data is image data, such as a 2D image or a 3D point cloud, the data domain may refer to a range of values a given pixel of the 2D image or a given point of the 3D point cloud may have, for example, in a given geographical location (such as a street, a district, a city, a country, and the like), in a given weather condition (such as cloudy, rainy, sunny, and the like), or a combination of both. In another example, the data domain may refer to a range of values the given pixel or the given point may have in a respective one of the 2D image and the 3D point cloud having been generated by a particular image sensor. In other words, in the context of the present specification, 3D point clouds generated by different LiDAR sensors are of different data domains.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 depicts a flowchart diagram of a method for controlling the vehicle, in accordance with certain non-limiting embodiments of the present technology.

Figure 1:
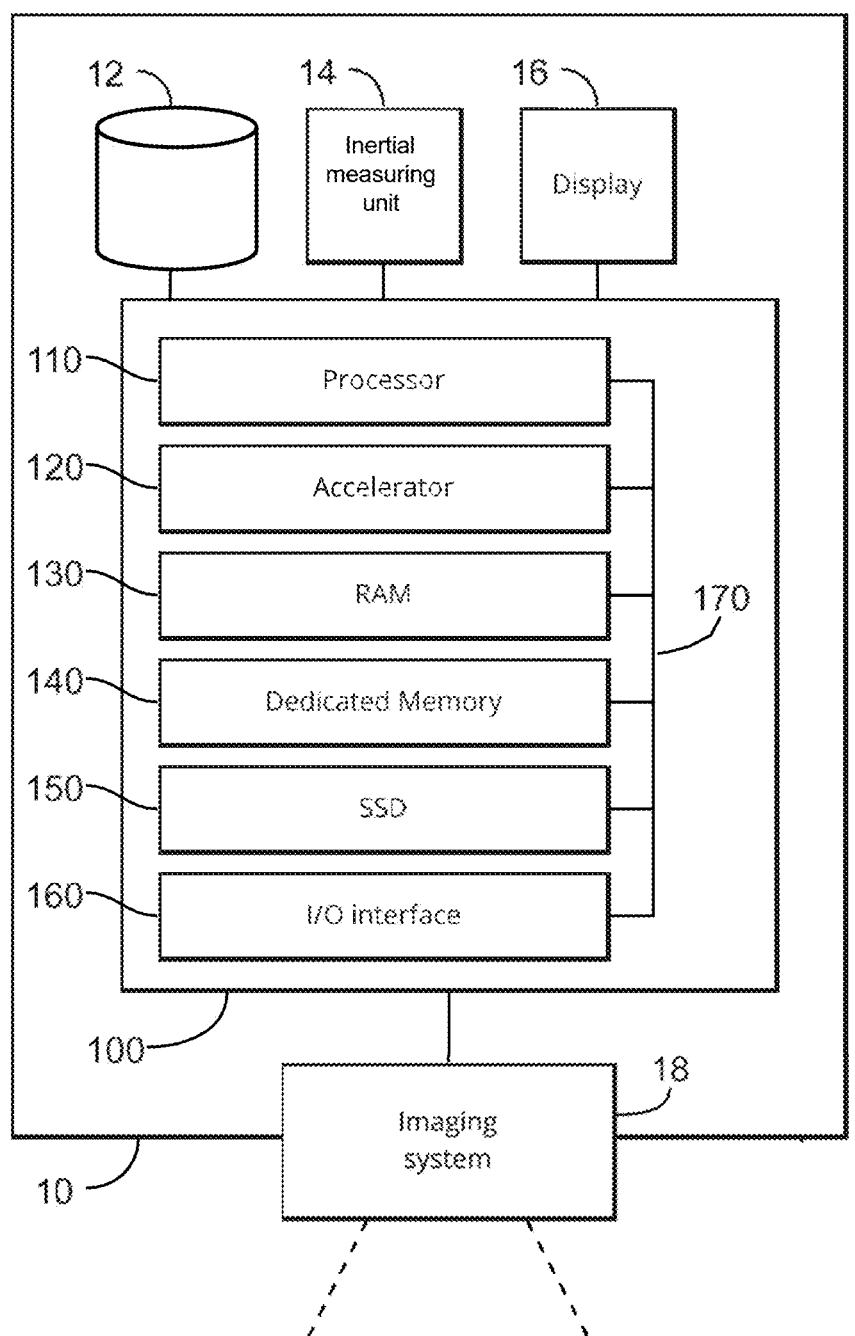
FIG. 1 depicts a schematic diagram of a computer system that can be used for implementing certain non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagram herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Certain non-limiting embodiments of the present technology are directed to methods and systems for operational monitoring and risk assessment of components in an autonomous. Examples of the autonomous vehicle can include, without limitation, self-driving cars, robotic vehicles, such as delivery or inventory robotic vehicles configured for driver-less operation, or aerial autonomous vehicles, such as drones.

Computer System

With reference to FIG. 1, there is depicted a schematic diagram of a computer system 10 that can be used for controlling operation of an autonomous vehicle (such as a vehicle 420 depicted in FIG. 4), in accordance with certain non-limiting embodiments of the present technology.

More specifically, the computer system 10 may be suitable for generating image data, such as 2D images and 3D point clouds representative of surroundings of the autonomous vehicle. Further, based on the data of the surrounding objects determined via the imaging data, as will be described below with reference to FIG. 3, the computer system 10 can be configured, for example, to generate a trajectory for the vehicle 420. In another example, based on the data of the surrounding objects, the computer system 10 can be configured to generate (or otherwise validate) a 3D map for navigation of the autonomous vehicle.

The computer system 10 comprises a computing unit 100 that may receive captured images of an object to be detected. The computing unit 100 may be configured to generate the 3D point cloud as a representation of the object to be detected. The computing unit 100 is described in greater details hereinbelow.

In some non-limiting embodiments of the present technology, the computing unit 100 may be implemented by any of a conventional personal computer, a controller, and/or an electronic device (e.g., a server, a controller unit, a control device, a monitoring device, a personal computer, a laptop, a tablet, etc.) and/or any combination thereof appropriate to the relevant task at hand. In some non-limiting embodiments of the present technology, the computing unit 100 comprises various hardware components including one or more single or multi-core processors collectively represented by a processor 110, a solid-state drive 150, a random-access memory (RAM) 130, a dedicated memory 140 and an input/output interface 160. In some non-limiting embodiments of the present technology, the computing unit 100 may be a computer specifically designed to train and/or execute a machine learning algorithm (MLA) and/or deep learning algorithms (DLA). The computing unit 100 may be a generic computer system.

In some other non-limiting embodiments of the present technology, the computing unit 100 may be an "off-the-shelf" generic computer system. In some non-limiting embodiments of the present technology, the computing unit 100 may also be distributed amongst multiple systems (such as electronic devices or servers). The computing unit 100 may also be specifically dedicated to the implementation of the present technology. Other variations as to how the computing unit 100 can be implemented are envisioned without departing from the scope of the present technology.

Communication between the various components of the computing unit 100 may be enabled by one or more internal and/or external buses 170 (e.g., a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to certain non-limiting embodiments of the present technology, the solid-state drive 120 stores program instructions suitable for being loaded into the RAM 130 and executed by the processor 110. Although illustrated as the solid-state drive 150, any type of memory may be used in place of the solid-state drive 150, such as a hard disk, optical disk, and/or removable storage media. According to implementations of the present technology, the solid-state drive 120 stores program instructions suitable for being loaded into the RAM 130 and executed by the processor 110 for executing generation of 3D representation of objects. For example, the program instructions may be part of a library or an application.

The processor 110 may be a general-purpose processor, such as a central processing unit (CPU) or a processor dedicated to a specific purpose, such as a digital signal processor (DSP). In some non-limiting embodiments, the processor 110 may also rely on an accelerator 120 dedicated to certain given tasks, such as executing the methods set forth in the paragraphs below. In some embodiments, the processor 110 or the accelerator 120 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, in certain non-limiting embodiments of the present technology, the computer system 10 comprises an imaging system 18 that may be configured to capture Red-Green-Blue (RGB) images or a series thereof. The imaging system 18 may comprise camera sensors such as, but not limited to, Charge-Coupled Device (CCD) or Complementary Metal Oxide Semiconductor (CMOS) sensors and/or digital cameras.

Further, according to certain non-limiting embodiments of the present technology, the imaging system 18 may be configured to convert an optical image into an electronic or digital image and may send captured images to the computing unit 100. To that end, in some non-limiting embodiments of the present technology, the imaging system 18 can include a camera sensor (such as a camera sensor 302 depicted in FIG. 3) configured for generating RGB pictures. In a specific non-limiting example, the camera sensor 302 can be implemented as a camera of a type available from FLIR INTE-GRATED IMAGING SOLUTIONS INC., 12051 Riverside Way, Richmond, BC, V6 W 1K7, Canada. It should be expressly understood that the single-lens camera can be implemented in any other suitable equipment.

Further, in other non-limiting embodiments of the present technology, the imaging system 18 comprises depth sensors configured to acquire RGB-Depth (RGBD) pictures. In yet other non-limiting embodiments of the present technology, the imaging system 18 can include a LiDAR sensor (such as a LiDAR sensor 304 depicted in FIG. 3) configured for gathering information about surroundings of the computer system 10 or another system and/or object to which the computer system 10 is coupled. It is expected that a person skilled in the art would understand the functionality of the LiDAR sensor 304, but briefly speaking, a light source of the LiDAR sensor 304 is configured to send out light beams that, after having reflected off one or more surrounding objects in the surroundings of the computer system 10, are scattered back to a receiver of the LiDAR sensor 304. The photons that come back to the receiver are collected with a telescope and counted as a function of time. Using the speed of light (~3λ10^8 m/s), the processor 110 of the computing unit 100 of the computer system 10 can then calculate how far the photons have traveled (in the round trip). Photons can be scattered back off of many different entities surrounding the computer system 10.

In a specific non-limiting example, the LiDAR sensor 304 can be implemented as the LiDAR based sensor that may be of the type available from VELODYNE LIDAR, INC. of 5521 Hellyer Avenue, San Jose, CA 95138, United States of America. It should be expressly understood that the LiDAR sensor 304 can be implemented in any other suitable equipment.

Figure 3:
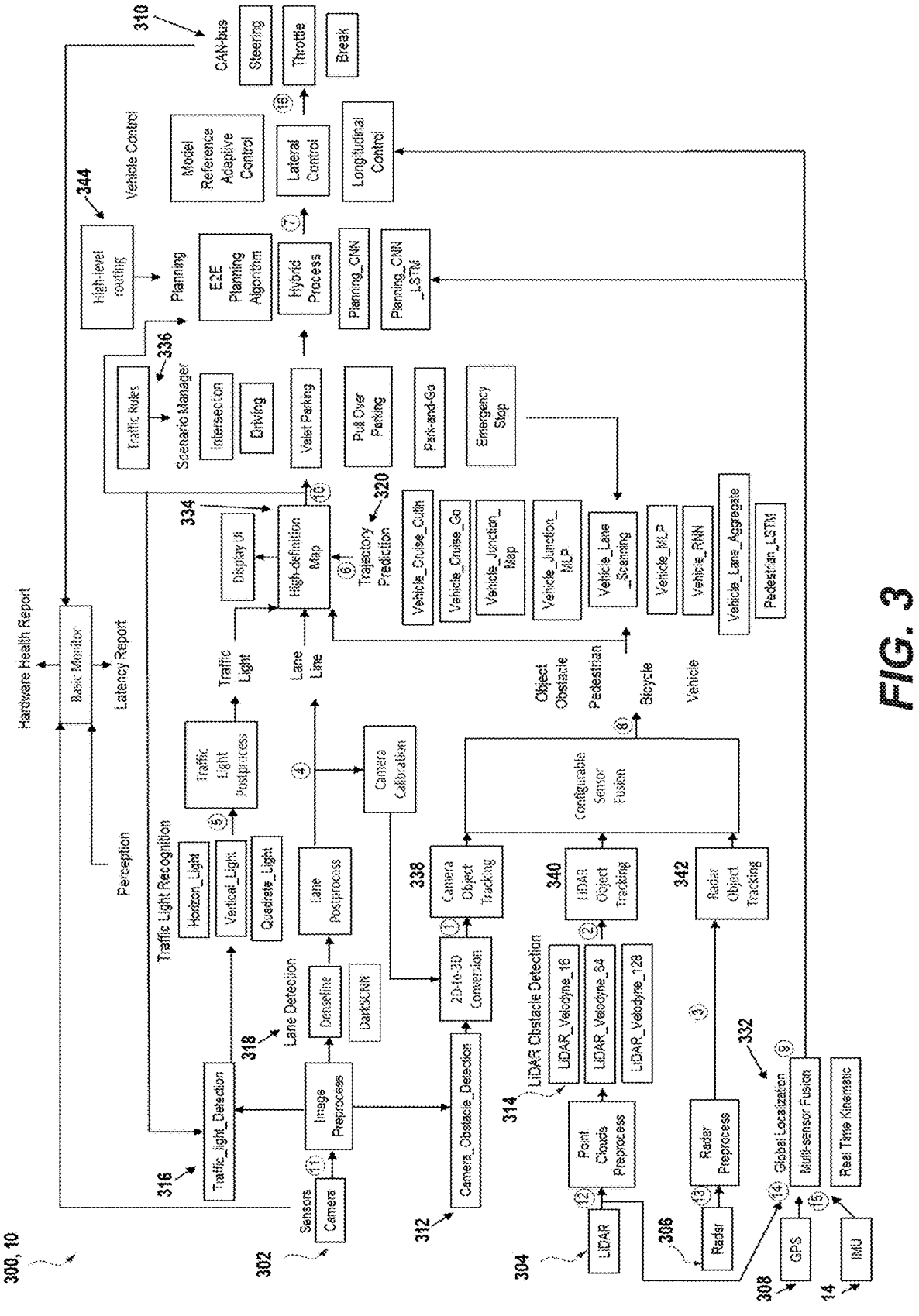
FIG. 3 depicts a schematic diagram of an autonomous driving pipeline executed by the computer system of FIG. 1 for controlling a vehicle, in accordance with certain non-limiting embodiments of the present technology.

In some non-limiting embodiments of the present technology, the imaging system 18 comprises one or more RADAR sensor that are communicatively coupled to the processor 110 of the computer system 10, such as a RADAR sensor 306 depicted in FIG. 3. Broadly speaking, the one or more radar-type sensors may be configured to make use of radio waves to gather data about various portions of the surroundings of the imaging system 18. For example, the RADAR sensor 306 may be configured to gather radar data about potential objects in the surroundings of the imaging system 18 and which data may be representative of a distance of objects from the RADAR sensor 306, orientation of objects, velocity and/or speed of objects, and the like.

In a specific non-limiting example, the RADAR sensor 306 comprises a 4D imaging RADAR of a Metawave™ SPEKTRA™ series available from METAWAVE CORPO-RATION of Carlsbad, 5993 Avenida Encinas, Suite 101, the United States, is one such system, comprising a 16 channel MIMO array on a single chip. It should be expressly understood that the RADAR sensor 306 can be implemented in any other suitable equipment.

Other implementations of the imaging system 18 enabling generating 3D point clouds, including, for example, depth sensors, 3D scanners, and other suitable devices are envisioned without departing from the scope of the present technology.

Thus, by using one of the approaches non-exhaustively described above, the imaging system 18 can be configured to generate 3D point clouds of surrounding objects of the computer system 10. For example, in those embodiments where the vehicle 420 is an outdoor autonomous vehicle, such as a self-driving car, such objects can include, without limitation, particles (aerosols or molecules) of water, dust, or smoke in the atmosphere, moving and stationary surrounding objects of various object classes. In this example, object classes of the moving surrounding objects can include, without limitation, vehicles, trains, cyclists, pedestrians or animals. By contrast, object classes of the stationary objects can include, without limitation, trees, fire hydrants, road posts, streetlamps, traffic lights, and the like.

In another example, where the vehicle 420 is an indoor autonomous vehicle, such as an inventory robot, the surrounding objects can include, without limitation, walls of the given room, furniture articles disposed therein, electric, and electronic devices installed or used in the given room (such as home appliances, for example), people, pets, and the like.

In some non-limiting embodiments of the present technology, the imaging system 18 of the computer system 10 can be implemented as an external imaging system (not depicted) configured to: (i) be coupled to the computer system 10 via a respective input/output external interface, such as, a Universal Serial Bus™ (USB) and various configurations thereof, as an example, or any other input/output interface non-exhaustively listed above, as an example; and (ii) transmit captured data to the computing unit 100.

Further, in some non-limiting embodiments of the present technology, the computer system 10 may comprise an Inertial Measuring Unit (IMU) 14 configured to be used in part by the computing unit 100 to determine a position of the imaging system 18 and/or the computer system 10. Therefore, the computing unit 100 may determine a set of coordinates describing the location of the imaging system 18, and thereby the location of the computer system 10, in a coordinate system based on the output of the IMU 14. Generation of the coordinate system is described hereinafter. The IMU 14 may comprise 3-axis accelerometer(s), 3-axis gyroscope(s), and/or magnetometer(s) and may provide velocity, orientation, and/or other position related information to the computing unit 100.

Also, in some non-limiting embodiments of the present technology, the computer system 10 may comprise one or more Global Positioning System (GPS) sensors (such as a GPS sensor 308 depicted in FIG. 3) that are configured to receive signals from GPS satellites rotating around the Earth. Based on the signals received from the GPS 308, the computer system 10 can be configured to determine at least one of a current speed value of the vehicle 420, a current position of the vehicle 420, and a current timing information. It should be understood that the present technology is not limited to GPS and may employ a positioning technology other than GPS—such as GLONASS, as an example.

Further, in some non-limiting embodiments of the present technology, the computer system 10 may include a screen or display 16 capable of rendering color 2D and/or 3D images captured by the imaging system 18. In some non-limiting embodiments of the present technology, the display 16 may be used to display live images captured by the imaging system 18, 3D point clouds, Augmented Reality (AR) images, Graphical User Interfaces (GUIs), program output, etc. In some embodiments, display 16 may comprise and/or be housed with a touchscreen to permit users to input data via some combination of virtual keyboards, icons, menus, or other Graphical User Interfaces (GUIs). In some non-limiting embodiments of the present technology, display 16 may be implemented using a Liquid Crystal Display (LCD)

display or a Light Emitting Diode (LED) display, such as an Organic LED (OLED) display. In other embodiments, display 16 may be remotely communicatively connected to the computer system 10 via a wired or a wireless connection (not shown), so that outputs of the computing unit 100 may be displayed at a location different from the location of the computer system 10. In this situation, the display 16 may be operationally coupled to, but housed separately from, other functional units and systems in computer system 10. The computer system 10 may be, for example, an iPhone or mobile phone from Apple or a Galaxy mobile phone or tablet from Samsung, or any other mobile device whose features are similar or equivalent to the aforementioned features. The device may be, for example and without being limitative, a handheld computer, a personal digital assistant, a cellular phone, a network device, a camera, a smart phone, an enhanced general packet radio service (EGPRS) mobile phone, a network base station, a media player, a navigation device, an e-mail device, a game console, or a combination of two or more of these data processing devices or other data processing devices.

According to certain non-limiting embodiments of the present technology, the computer system 10 may comprise a memory 12 communicatively connected to the computing unit 100 and configured to store without limitation data, captured images, depth values, sets of coordinates of the computer system 10, 3D point clouds, and raw data provided by IMU 14 and/or the imaging system 18. The memory 12 may be embedded in the computer system 10. The computing unit 100 may be configured to access a content of the memory 12 via a network (not shown) such as a Local Area Network (LAN) and/or a wireless connexion such as a Wireless Local Area Network (WLAN).

The computer system 10 may also include a power system (not depicted) for powering its components. The power system may include a power management system, one or more power sources (e.g., battery, alternating current (AC)), a recharging system, a power failure detection circuit, a power converter or inverter and any other components associated with the generation, management, and distribution of power in mobile or non-mobile devices.

As such, in at least some embodiments of the present technology, the computer system 10 may also be suitable for generating the 3D point cloud of a given object directly or based on 2D or 3D images thereof. Such images may have been captured by the imaging system 18, as described in detail above. As an example, the computer system 10 may generate the 3D point cloud according to the teachings of the Patent Cooperation Treaty Patent Publication No. 2020/240497, an entirety of the contents which is hereby incorporated by reference.

Figure 2:
FIG. 2 depicts a schematic diagram of an example representation of objects captured by an imaging system of the computer system of FIG. 1 that are to be detected, in accordance with certain non-limiting embodiments of the present technology.

With reference to FIG. 2, there is depicted a schematic diagram of a representation of a given road section 202 as perceived from a point of view of the imaging device 18 when the computer system 10 is used as part of the control system of the vehicle 420, in accordance with certain non-limiting embodiments of the present technology.

As it can be appreciated from FIG. 2, the processor 110 of the computer system 10 can be configured to generate a given 3D point cloud 204 including data points representative of objects in the given road section 202, such as a given surrounding object 206. Generally speaking, a given data point is a point in 3D space indicative of at least a portion of a surface of the given surrounding object 206 in the given road section 202 that has been captured by the imaging system 18 of the computer system 10.

Further, as mentioned above, based on the given 3D point cloud 204, the computer system 10 can detect the given surrounding object 206 therein. In other words, the computer system 10 can be configured: (i) to localize the given surrounding object 206 in a coordinate system associated, for example, with the imaging system 18 or the vehicle 420; and (ii) determine a respective object class of the given surrounding object 206, that is, a vehicle. More specifically, according to certain non-limiting embodiments of the present technology, the computer system 10 can be configured to localize the given surrounding object 206 in the given 3D point cloud 204 by generating, around the given surrounding object 206, a respective bounding box 208; and based on features of data points of the given 3D point cloud 204 within the respective bounding box 208, determine the respective object class of the given surrounding object 206. Further, based on the so determined object class of the given surrounding object 206, the computer system 10 can be configured to generate a movement trajectory for the vehicle 420.

To do so, according to certain non-limiting embodiments of the present technology, the computer system 10 can be configured to execute an autonomous driving pipeline 300, a schematic diagram of which is depicted, according to certain non-limiting embodiments of the present technology, in FIG. 3.

As it can be appreciated, the autonomous driving pipeline 300 comprises a plurality of components, each of which is configured for generating and using data used for controlling the movement of the vehicle 420.

According to certain non-limiting embodiments of the present technology, the plurality of components of the autonomous vehicle pipeline 300 include a plurality of hardware components. According to certain non-limiting embodiments of the present technology, the plurality of hardware components includes sensors of the imaging system 18 described above and hardware components of the computer system 10 described in detail above. More specifically, according to certain non-limiting embodiments of the present technology, the sensors of the plurality of hardware components can include: the camera sensor 302, the LiDAR sensor 304, the RADAR sensor 306, the GPS sensor 308, and the IMU sensor 14. Further, the hardware components of the computer system 10 can include, without limitation, the processor 110 and the RAM 130, as an example.

Also, according to certain non-limiting embodiments of the present technology, the plurality of hardware components of the autonomous driving pipeline 300 can include a communication link 310 between other components of the plurality of components of the autonomous driving pipeline 300 and components of the vehicle 420 causing the movement thereof, such as an ignition component, a stalling component, an accelerator pedal, a brake pedal, and a steering wheel, as an example. In a specific non-limiting example, the communication link 310 can comprise a Control Area Network (CAN) bus. Other implementations of the communication link are also envisioned.

Further, according to certain non-limiting embodiments of the present technology, the plurality of components of the autonomous driving pipeline 300 executed by the computer system 10 for controlling the vehicle 420 can include a plurality of learning-enabled components (LECs). In some non-limiting embodiments of the present technology, a given LEC of the plurality of LECs is implemented based on a machine-learning (ML) model that has been trained, based on the image data from the imaging system 18, that is, from the camera or LiDAR sensors 302, 304, for example, to localize and determine respective object classes (such as a vehicle, a pedestrian, a guardrail, and the like) of objects in the surroundings of the vehicle 420. In other words, the given LEC can be configured to detect objects in the surroundings of the vehicle 420. For example, in these embodiments, the given LEC can comprise: (i) a camera object tracking and detection ML model 312 that has been trained to detect objects and track movement thereof in the surroundings of the vehicle 420 based on 2D image data from the camera sensor 302; (ii) a LiDAR object tracking and detection ML model 314 that has been trained to detect the objects and track the movement thereof in the surroundings of the vehicle 420 based on 3D point clouds from the LiDAR sensor 304; and (iii) a RADAR object tracking and detection ML model (not depicted) that has been trained to detect the objects and track the movement thereof in the surroundings of the vehicle 420 based on 2D image data from the RADAR sensor 306.

Also, in some non-limiting embodiments of the present technology, the given LEC can include an ML model that has been trained to detect objects of a specific object class. For example, the given LEC can comprise a traffic light detection ML model 316 that has been trained, based on the 2D image data generated by the camera sensor 302, to identify, localize, and determine a current state of a given traffic light in the surroundings of the vehicle 420. In another example, the given LEC can comprise a lane line detecting ML model 318 that has been trained, based on the 2D image data generated by the camera sensor 302, to identify and localize a lane line marking on a road within the surroundings of the vehicle 420.

Further, in some non-limiting embodiments of the present technology, the plurality of LECs can comprise a trajectory prediction ML model 320 that has been trained to predict the movement trajectory for the vehicle 420 based on data provided by at least one of the camera object tracking and detection ML model 312, the LiDAR object tracking and detection ML model 314, the RADAR object tracking and detection ML model (not depicted), the traffic light detection ML model 316, and the lane line detecting ML model 318.

How each LEC of the plurality of LECs is implemented is not limited and depends generally on a specific purpose of the given LEC. In various non-limiting embodiments of the present technology, the given LEC can be implemented based on a Neural Network (NN), including, for example, convolutional NN, such as Voxel ResNet, Point ResNet, PointNet, and UNet, a multilayer perceptron (MPL) NN, a long short-time memory (LSTM) NN, a recursive NN (RNN), and others. In a specific non-limiting example, where the given LEC has been trained to identify and localize objects, such as one of the camera object tracking and detection ML model 312 and the LiDAR object tracking and detection ML model 314, for example, the given LEC can be a CenterPoint-based neural network implemented as described, for example, in an article "*OBJECTS AS POINTS*", authored by Zhou et al., the content of which is incorporated herein by reference in its entirety. However, it should be expressly understood that other object detection frameworks can also be used for implementing the given LEC without departing from the scope of the present technology, including, without limitation, a PointPillars framework, a VoxelNet framework, a Point-Voxel Region-based Convolutional Neural Network (PV-RCNN), and a PillarNet framework.

Further, according to certain non-limiting embodiments of the present technology, the plurality of components of the autonomous driving pipeline 300 comprises a plurality of non-learning enabled components (NLECs) that, akin to the plurality of LECs, are also used for controlling the vehicle 420, however, are implemented without ML models. More specifically, according to certain non-limiting embodiments of the present technology, a given NLEC of the plurality of NLECs comprises a mathematical of heuristic model configured to analyze data from multiple sources. In a specific non-limiting example, the given NLEC can be implemented as a Kalman Filter. Other implementations of the NLEC, such as kinematic mathematical models are also envisioned without departing from the scope of the present technology.

In some non-limiting embodiments of the present technology, the plurality of NLECs includes a global localization model 332 configured to determine a current position of the vehicle 420 based on data from the IMU sensor 14 and the GPS sensor 308. In some non-limiting embodiments of the present technology, the plurality of NLECs comprises a high definition (HD) map model 334 configured to generate a 3D representation of the surroundings of the vehicle 420 based on outputs of other components of the plurality of components of the autonomous driving pipeline 300. For example, in some non-limiting embodiments of the present technology, the HD map model 334 can be configured to the 3D representation of the surroundings of the vehicle 420 based on outputs of at least one of the camera object tracking and detection ML model 312, the LiDAR object tracking and detection ML model 314, the RADAR sensor 306, and the trajectory prediction ML model 320.

In some non-limiting embodiments of the present technology, the plurality of NLECs can include a traffic rules model 336 comprising a plurality of applicable road traffic rules in the surroundings of the vehicle 420, such as those prescribing priorities of passing through intersections in the surroundings of the vehicle 420, rules represented by road signs in the surroundings of the vehicle 420, rules prohibiting and permitting parking in the surroundings of the vehicle 420, and rules limiting speed in the surroundings of the vehicle 420, an example.

In some non-limiting embodiments of the present technology, the plurality of NLECs further includes an object tracking model, such as one of camera object tracking model 338, a LiDAR object tracking model 340, and a RADAR object tracking model 342 that are independently from each other configured to localize the given object in the surroundings of the vehicle 420 based on outputs the camera object tracking and detection ML model 312, the LiDAR object tracking and detection ML model 314, and the RADAR sensor 306, respectively.

In some non-limiting embodiments of the present technology, the plurality of NLECs can further include a trajectory planning model 344 configured to consolidate outputs of other ones of the plurality of components of the autonomous driving pipeline 300 for generating the movement trajectory for the vehicle 420. More specifically, in some non-limiting embodiments of the present technology, the trajectory planning model 344 can be configured to generate the movement trajectory for the vehicle 420 based on outputs of the global localization model 332, the HD map model 334, and the traffic rules model 336.

It should be expressly understood that use of other LEC and NLEC as well as hardware components in the autonomous driving pipeline 300 for controlling the vehicle 420 is also envisioned.

Figure 4:
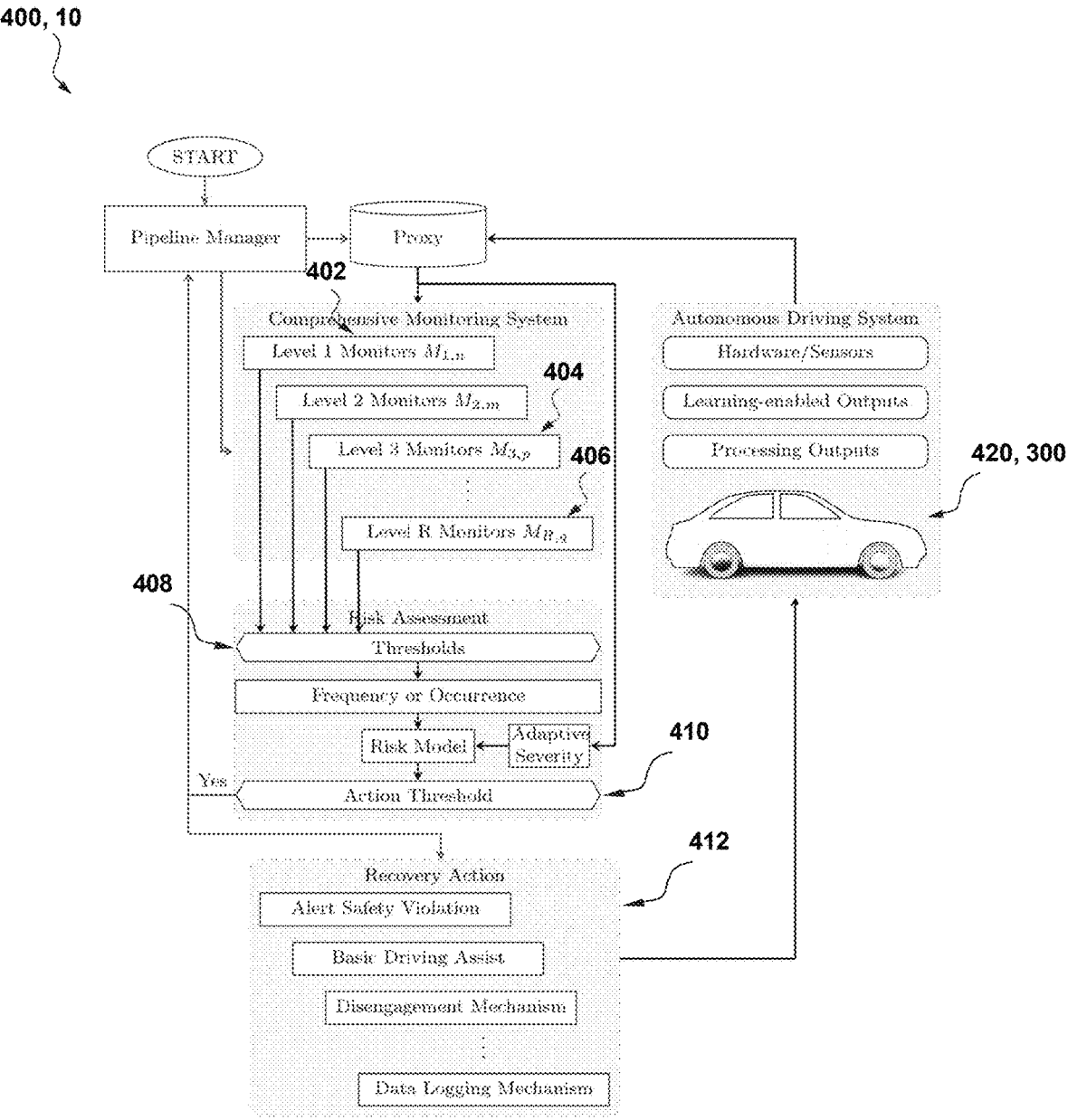
FIG. 4 depicts a schematic diagram of a risk management processing pipeline executed by the computer system of FIG. 1 in parallel to executing the autonomous driving pipeline of FIG. 3, in accordance with certain non-limiting embodiments of the present technology.

Further, for safety monitoring of the autonomous driving pipeline 300, in some non-limiting embodiments of the present technology, the computer system 10 can be configured to execute, in parallel to the autonomous driving pipeline 300, a risk management processing pipeline 400, a schematic diagram of which is depicted in FIG. 4, in accordance with certain non-limiting embodiments of the present technology.

To execute the risk management processing pipeline 400, according to certain non-limiting embodiments of the present technology, the computer system 10 can be configured to acquire monitoring data from at least one monitoring source within the autonomous driving pipeline 300. According to certain non-limiting embodiments of the present technology, the at least one monitoring source comprises a given one of the plurality of components of the autonomous driving pipeline 300.

More specifically, in some non-limiting embodiments of the present technology, if the at least one monitoring source comprises a hardware component of the plurality of hardware components described above, the monitoring data therefrom can comprise a numerical value indictive of at least one of a connectivity status of the hardware component within the autonomous driving pipeline 300 and a health status of the hardware component, which can include data representative of internal hardware errors of the hardware components. For example, the internal hardware errors can include errors representative of the hardware component being overheated, power surges on the hardware component, a failure of at least one internal component of the hardware component, and the like.

Further, if the at least one monitoring source comprises the given LEC from the plurality of LECs described above, the monitoring data therefrom can include at least one of a numerical vector indicative of a respective output of the given LEC and numerical value indicative a confidence level associated with the respective output of the given LEC. For example, as explained in detail above, if the given LEC is an object detection and tracking ML model, such as one of the camera and LiDAR object detection and tracking ML model 312, 314, the respective output can include an object class (a pedestrian, a vehicle, a bicycle, and others) and a location of at least one object in the surroundings of the vehicle 420. In another example, if the given LEC comprises the trajectory prediction ML model 320, the respective output thereof includes a vector of coordinates and respective timestamps associated therewith representative of locations and corresponding moment in time for the vehicle 420 to take within a predetermined time period in future, defining a future movement trajectory of the vehicle 420.

According to certain non-limiting embodiments of the present technology, the confidence level associated with the respective output of the given LEC can include, for example, a Gini index. Use of other metrics for assessing the confidence level of the given ML model is also envisioned.

Further, according to certain non-limiting embodiments of the present technology, if the at least one monitoring source of the risk management processing pipeline 400 is the given NLEC of the plurality of NLECs described above, the monitoring data therefrom can include numerical values including at least one of: spatial and temporal proximity values between the vehicle 420 and the at least one object in the surroundings thereof; a current stopping distance value of the given vehicle 420 given current kinematic parameters thereof (such as a current speed value and a current acceleration value); a rear-end collision risk index; and a modified time to a collision for the vehicle 420, for example.

Further, according to certain non-limiting embodiments of the present technology, the computer system 10 can be configured to receive the monitoring data from at least two monitoring sources, such as a first monitoring source 402 and a second monitoring sources 404. According to certain non-limiting embodiments of the present technology, the first and second monitoring sources 402, 404 can be components of the plurality of components of the autonomous driving pipeline 300 of different types. For example, if the first monitoring source 402 is a hardware component, the second monitoring component 404 can be one of an LEC and an NLEC. In some non-limiting embodiments of the present technology, where the computer system 10 is configured to collect the monitoring data from more than two monitoring sources, for example, also from a third monitoring source 406, aside from the first and second monitoring sources 402, 404, each one of the first, second, and third monitoring sources 402, 404, and 406 can be of different respective types. In other words, the first monitoring source 402 can be the hardware component, the second monitoring source 404 can be the LEC, and the third monitoring source 406 can be the NLEC.

Also, in some non-limiting embodiments of the present technology, a given monitoring source of the first, second, and third monitoring sources 402, 404, and 406 can include more than one component of the plurality of components of the autonomous driving pipeline 300. For example, the given monitoring source can include a set of components of the same component type, such as one of the hardware components, and NLECs. In some non-limiting embodiments of the present technology, the given monitoring source can include a set of components of different component types. In these embodiments, the given monitoring source can include at least one component of one component type, such as the hardware component, and at least one other component of an other component type, such as one of the LEC and the NLEC. In these embodiments, a number of components in each monitoring source of the risk management processing pipeline 400 as well as a number thereof is not limited and can be selected, by the computer system 10, for example, based on available computational resources of the computer system 10 or a desired level of safety monitoring of the autonomous driving pipeline 300.

Further, according to certain non-limiting embodiments of the present technology, the computer system 10 can be configured to determine, based on the monitoring data from the plurality of components of the autonomous driving pipeline 300, a cumulative risk assessment value. In some non-limiting embodiments of the present technology, the computer system 10 can be configured to determine a combination of the numerical values of the monitoring data received from different components of the plurality of components of the autonomous driving pipeline 300.

In some non-limiting embodiments of the present technology, the computer system 10 can be configured to determine the cumulative risk assessment value as a combination of respective frequency values of the numerical values respective components of the plurality of components of the autonomous driving pipeline 300 exceeding respective threshold values. More specifically, the computer system 10 can be configured to: (i) receive, for each one of the numerical values associated with the respective components of the autonomous driving pipeline 300, respective threshold values 408; (ii) in response to at least one of the numerical values exceeding the respective threshold value 408, determine respective frequency values of the at least one numerical value exceeding the respective threshold value over a predetermined period (such as one minute, five minutes, or 10 minutes); and (iii) determine the cumulative risk assessment value as a combination of the frequency values. For example, the computer system 10 can be configured to determine that the current stopping distance value received from the respective NLEC exceeds the respective stopping distance threshold. In response, the computer system 10 can be configured to determine a frequency of the current stopping distance value exceeding the respective threshold value. Further, the computer system 10 can be configured to use the respective frequency of the current stopping distance value exceeding the respective threshold value for determining the cumulative risk assessment value.

In some non-limiting embodiments of the present technology, the computer system 10 can be configured to determine the combination of only those frequency values that are equal to or higher than a respective predetermined frequency threshold. Continuing with the example of the current distance value, the computer system 10 can be configured to consider the frequency value of the current distance value exceeding the respective threshold value only of the frequency value is equal to or higher than the respective predetermined frequency threshold, such as 5, 20, or 30 occurrences per minute, as an example. In other words, in these embodiments, the computer system 10 can be configured to consider given monitoring data only if it exceeds the respective threshold values 408 more frequently than the respective predetermined frequency threshold. Needless to mention that for each numerical value, from the respective monitoring source, the respective predetermined frequency threshold can be different.

According to certain non-limiting embodiments of the present technology, the combination can include a sum or a multiplication of the numerical values from the respective components of the plurality of components of the autonomous driving pipeline 300. In some non-limiting embodiments of the present technology, the combination can include a weighted combination of the numerical values or the respective frequency values of at least some thereof exceeding their respective threshold values. To that end, according to certain non-limiting embodiments of the present technology, the computer system 10 can be configured to assign, to each component (be it a given numerical value from the respective monitoring source or the respective frequency of the given numerical value exceeding its threshold value) of the combination, a respective severity level. According to certain non-limiting embodiments of the present technology, the computer system 10 can be configured to determine the respective severity level based on external factors influencing at least one of the numerical values of the monitoring data received from the monitoring sources of the risk management processing pipeline 400.

According to certain non-limiting embodiments of the present technology the external factors comprise at least one of a current weather condition, a current traffic situation, a current environment (such as a traffic zone, including, for example, a school zone or an intersection) of the vehicle, an ego-speed of the vehicle, and a current time of day. For example, an accuracy of the image data received from the LiDAR sensor 306 can be decreased during rainy or snowy weather; therefore, during such a weather condition, the computer system 10 can be configured to increase the respective severity level for the component of the combination associated with the data received from the LiDAR object tracking and detection ML model 314. In another example, during a heavy traffic situation, the computer system 10 can be configured to increase the respective severity level for the component of the combination associated the current stopping distance value. Other examples of the external factors are also envisioned.

In some non-limiting embodiments of the present technology, the computer system 10 can be configured to determine the cumulative risk assessment value in accordance with a following equation:

$$R = \Sigma(F \times S), \tag{1}$$

where F is the respective frequency value of the given numerical value exceeding the respective threshold value; and S is the respective severity level assigned to the given numerical value.

Further, according to certain non-limiting embodiments of the present technology, the computer system 10 can be configured to: (i) determine whether the cumulative risk assessment value exceeds a predetermined main threshold value 410; and (ii) in response to determining that the cumulative risk assessment value exceeds the predetermined main threshold value 410, generate a warning notification, such as a message; and (iii) output the warning notification on a screen of the computer system 10.

Further, in some non-limiting embodiments of the present technology, the computer system 10 can be configured to determine a frequency of occurrence of the warning notification over a predetermined period, such as one minute, five minutes, or ten minutes, for example. Further, in response to the frequency of occurrence of the warning notification being greater than a predetermined frequency threshold, the computer system 10 can be configured to cause an execution of a remedial action 412 in the autonomous driving pipeline 300.

For example, in various non-limiting embodiments of the present technology, the remedial action 412 can comprise at least one of: generating a safety alert, handing over control of the vehicle 420 to a human driver that is present in the vehicle 420, and logging the events occurring in the autonomous driving pipeline 300 into an event log. Also, in some non-limiting embodiments of the present technology, the remedial action 412 can comprise a fail-safe remedial action (also referred to herein as an "escape maneuver") which is to be executed by the vehicle 420 to put the vehicle 420 in a safe state. For example, the fail-safe remedial action can be an emergency braking, causing the vehicle 420 to decelerate abruptly or to stop, changing to the right lane, and so on.

Thus, certain non-limiting embodiments of the present technology may allow for a more holistic approach to maintaining the functionality and safety of the autonomous driving pipeline 300 in dynamic and potentially unpredictable environments, which may allow increase predictability and safety of operation of the vehicle 420.

Given the architecture and examples provided hereinabove, it is now possible to execute a method for controlling a vehicle, such as the vehicle 420 described above. With reference to FIG. 5, there is depicted a flowchart diagram of a method 500, in accordance with certain non-limiting embodiments of the present technology.

Step 502: Acquiring First Monitoring Data from a First Monitoring Source

The method 500 commences at step 502 with the computer system 10 being configured to execute, in parallel with the autonomous driving pipeline 300 for controlling the vehicle 420, the risk management processing pipeline 400 thereof, which is schematically illustrated in FIG. 4 mentioned above.

To that end, according to certain non-limiting embodiments of the present technology, the computer system 10 can be configured to receive first monitoring data from the first monitoring source 402 of the autonomous driving pipeline 300. As mentioned hereinabove, the first monitoring source 402 can be one of (1) a hardware component of the plurality of hardware components, (2) an LEC of the plurality of LECs, and (3) an NLEC of the plurality of NLECs of the autonomous driving pipeline 300, described in detail above with reference to FIG. 3.

The method 500 hence advances to step 504.

Step 504: Acquiring Second Monitoring Data from a Second Monitoring Source

At step 504, according to certain non-limiting embodiments of the present technology, the computer system 10 can be configured to receive second monitoring data from the second monitoring source 404. As mentioned hereinabove, the second monitoring source 404 can be of a different type from the first monitoring source 402. For example, if the first monitoring source 402 is a hardware component, the second monitoring source 404 can be an LEC.

Further, according to certain non-limiting embodiments of the present technology, the computer system 10 can be configured to receive third monitoring data from the third monitoring source 406. The third monitoring source 406 can be of a different type from the first monitoring source 402 and the second monitoring source 404. For example, if the first monitoring source 402 is a hardware component, and the second monitoring source 404 is an LEC, the third monitoring source 406 can be an NLEC of the plurality of NLECs.

Also, as mentioned further above, a format and nature of the given one of the first, second, and third monitoring data depends on the first, second, and third monitoring sources 402, 404, and 406, respectively, as described above.

The method 500 hence advances to step 506.

Step 506: Generating a Cumulative Risk Assessment Value

At step 506, according to certain non-limiting embodiments of the present technology, the computer system 10 can be configured to determine, based on the monitoring data from at least two monitoring sources, such as the first monitoring source 402 and the second monitoring source 404, the cumulative risk assessment value. As mentioned hereinabove, the computer system 10 can be configured to determine the cumulative risk assessment value as a combination of the acquired monitoring data. The combination can include, for example, a sum or multiplication of numerical values from the respective monitoring source.

In other non-limiting embodiments of the present technology, the computer system 10 can be configured to determine a combination of frequency values of the numerical values from different monitoring sources exceeding the respective threshold data. More specifically, the computer system 10 can be configured to: (i) receive, for each one of the numerical values associated with the respective components of the autonomous driving pipeline 300, respective threshold values 408; (ii) in response to at least one of the numerical values exceeding the respective threshold value 408, determine respective frequency values of the at least one numerical value exceeding the respective threshold value over a predetermined period (such as one minute, five minutes, or 10 minutes); and (iii) determine the cumulative risk assessment value as a combination of the frequency values.

In some non-limiting embodiments of the present technology, as mentioned further above, the computer system 10 can be configured to consider the given monitoring data in the combination if the frequency value of the given monitoring data exceeding the respective threshold value exceeds the respective predetermined frequency value.

Further, according to certain non-limiting embodiments of the present technology, the combination for the cumulative risk assessment value can include a weighted combination of the numerical values or the respective frequency values of at least some thereof exceeding their respective threshold values. To that end, as mentioned further above, according to certain non-limiting embodiments of the present technology, the computer system 10 can be configured to assign, to each component of the combination, the respective severity level. According to certain non-limiting embodiments of the present technology, the computer system 10 can be configured to determine the respective severity level based on external factors influencing at least one of the numerical values of the monitoring data received from the monitoring sources of the risk management processing pipeline 400. According to certain non-limiting embodiments of the present technology, the external factors can include at least one of a current weather condition, a current traffic situation, and a current time of day.

In some non-limiting embodiments of the present technology, the computer system 10 can be configured to determine the cumulative risk assessment value for the autonomous driving pipeline 300 according to Equation (1) above.

The method 500 hence advances to step 508.

Step 508: In Response to the Cumulative Risk Assessment Value Being Above a Pre-Determined Main Threshold, Generating A Warning Notification At step 508, according to certain non-limiting embodiments of the present technology, the computer system 10 can be configured to: (i) determine whether the cumulative risk assessment value exceeds the predetermined main threshold value 410; and (ii) in response to determining that the cumulative risk assessment value exceeds the predetermined main threshold value 410, generate the warning notification, such as a message; and (iii) output the warning notification on the screen of the computer system 10.

The method 500 hence advances to step 510.

Step 510: In Response to a Frequency of Occurrence of the Generating the Warning Notification being Above a Pre-Determined Frequency Threshold, Triggering a Remedial Action At step 510, in some non-limiting embodiments of the present technology, the computer system 10 can be configured to determine the frequency of occurrence of the warning notification over a predetermined period, such as one minute, five minutes, or ten minutes, for example. Further, in response to the frequency of occurrence of the warning notification being greater than the predetermined frequency threshold, the computer system 10 can be configured to cause an execution of the remedial action 412 in the autonomous driving pipeline 300.

According to certain non-limiting embodiments of the present technology, the remedial action 412 can include at least one of: the remedial action 412 can comprise at least one of: generating a safety alert, handing over control of the vehicle 420 to a human driver that is present in the vehicle 420, logging the events occurring in the autonomous driving pipeline 300 into an event log, and the fail-safe remedial action as described above.

The method 500 hence terminates.

It should be expressly understood that not all technical effects mentioned herein need to be enjoyed in each and every embodiment of the present technology.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

While the application examples of the technology described in the present disclosure is Autonomous Driving Systems (ADS), it may be used and extended to various other domains, including robotics, cinematography, visual effects, advertising, military applications, AR/VR, construction, real estate (for planning, buying, selling), and medical scene/image 3D reconstruction, among others, wherein camera images (and/or LiDAR data points) serve as inputs. This proposed technology demonstrates capability in swiftly and realistically reconstructing and simulating scenarios featuring static backgrounds and dynamic actors.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for controlling a vehicle, the method comprising:

executing a first processing pipeline, including:
triggering control over the vehicle; and executing, in parallel to the first processing pipeline, a risk management processing pipeline, including:
acquiring first monitoring data from a first monitoring source used in the first processing pipeline;
acquiring second monitoring data from a second monitoring source used in the first processing pipeline;

generating a cumulative risk assessment value based on a combination of the first monitoring data and the second monitoring data;

in response to the cumulative risk assessment value being above a pre-determined main threshold, generating a warning notification;

in response to a frequency of occurrence of the generating the warning notification being above a pre-determined frequency threshold, triggering, independently from the first processing pipeline, a remedial action to be performed by the vehicle; and acquiring external factor data indicative of external factors;

generating, for at least one of the first and second monitoring data, a respective severity level based on the external factor data;

wherein the cumulative risk assessment value is generated based on the following:

$$R = \sum (F \times S),$$

wherein F is a respective frequency value of one of the first and second monitoring data exceeding a respective threshold value; and S is the respective severity level associated with the one of the first and second monitoring data.

2. The method of claim 1, wherein the external factors influence the at least one of the first monitoring data and the second monitoring data.

3. The method of claim 2, wherein the external factors comprise at least one of a current weather condition, a current traffic situation, a current environment of the vehicle, an ego-speed of the vehicle, and a current time of day.

4. The method of claim 1, wherein a given one of the first and second monitoring sources comprises one of a hardware component of a plurality of hardware components, a learning-enabled component (LEC) of a plurality of LECs, and a non-learning-enabled component (NLEC) of a plurality of NLECs of the vehicle that are used in the first processing pipeline for controlling the vehicle.

5. The method of claim 4, wherein the plurality of hardware components comprise a plurality of sensors of the vehicle and an electronic device communicatively coupled thereto, the plurality of sensors comprising:
   a camera sensor;
   a LIDAR sensor;
   a RADAR sensor;
   a Global Positioning System (GPS) sensor; and
   an Inertial Measurement Unit (IMU) sensor; and
the electronic device comprising:
   a processor;
   a read-access memory (RAM); and
   a CAN-bus.

6. The method of claim 4, wherein the plurality of LECs comprises:
   a camera object detection or tracking machine-learning (ML) model;
   a LIDAR object detection or tracking ML model;
   a RADAR object detection or tracking ML model;
   a lane line detecting ML model;
   a traffic light recognizing ML model; and
   a trajectory predicting ML model.

7. The method of claim 4, wherein the plurality of NLECs comprises:
   a trajectory planning model;
   an object tracking model;
   a global localization model; and
   a high definition (HD) map.

8. The method of claim 4, wherein the given one of the first and second monitoring data is indicative of at least one of:
   a connection status of each one of the plurality of hardware components;
   a confidence level of a respective output of each one of the plurality of LECs;
   consistency among respective outputs of the plurality of LECs and the plurality of NLECs;
   a smoothness of a current trajectory traversed by the vehicle; and
   a spatial and temporal proximity of the vehicle to at least one object in a surrounding area.

9. The method of claim 1, wherein the remedial action comprises at least one of generating a safety alert, handing over control of the vehicle to a human driver present in the vehicle, stopping the vehicle, and logging events occurring in the first processing pipeline.

10. A system for controlling a vehicle, the system comprising at least one processor, at least one non-transitory computer-readable memory storing instructions, which, when executed by the at least one processor, cause the system to perform:
   executing a first processing pipeline, including:
      triggering control over the vehicle; and
   executing, in parallel to the first processing pipeline, a risk management processing pipeline, including:
      acquiring first monitoring data from a first monitoring source used in the first processing pipeline;
      acquiring second monitoring data from a second monitoring source used in the first processing pipeline;

generating a cumulative risk assessment value based on a combination of the first monitoring data and the second monitoring data;
in response to the cumulative risk assessment value being above a pre-determined main threshold, generating a warning notification;
in response to a frequency of occurrence of the generating the warning notification being above a pre-determined frequency threshold, triggering, independently from the first processing pipeline, a remedial action to be performed by the vehicle; and
acquiring external factor data indicative of external factors;
generating, for at least one of the first and second monitoring data, a respective severity level based on the external factor data;
wherein the cumulative risk assessment value is generated based on the following:

$$R = \sum (F \times S),$$

wherein F is a respective frequency value of one of the first and second monitoring data exceeding a respective threshold value; and
   S is the respective severity level associated with the one of the first and second monitoring data.

11. The system of claim 10, wherein the external factors influence the at least one of the first monitoring data and the second monitoring data.

12. The system of claim 11, wherein the external factors comprise at least one of a current weather condition, a current traffic situation, a current environment of the vehicle, an ego-speed of the vehicle, and a current time of day.

13. The system of claim 10, wherein a given one of the first and second monitoring sources comprises one of a hardware component of a plurality of hardware components, a learning-enabled component (LEC) of a plurality of LECs, and a non-learning-enabled component (NLEC) of a plurality of NLECs of the vehicle that are used in the first processing pipeline for controlling the vehicle.

14. The system of claim 13, wherein the plurality of hardware components comprise a plurality of sensors of the vehicle and an electronic device communicatively coupled thereto,
   the plurality of sensors comprising:
      a camera sensor;
      a LIDAR sensor;
      a RADAR sensor;
      a Global Positioning System (GPS) sensor; and
      an Inertial Measurement Unit (IMU) sensor; and
   the electronic device comprising:
      a processor;
      a read-access memory (RAM); and
      a CAN-bus.

15. The system of claim 13, wherein the plurality of LECs comprises:
   a camera object detection or tracking machine-learning (ML) model;
   a LIDAR object detection or tracking ML model;
   a RADAR object detection or tracking ML model;
   a lane line detecting ML model;
   a traffic light recognizing ML model; and
   a trajectory predicting ML model.

16. The system of claim 13, wherein the plurality of NLECs comprises:

a trajectory planning model;

an object tracking model; and a global localization model; and a high definition (HD) map.

17. The system of claim 13, wherein the given one of the first and second monitoring data is indicative of at least one of:

a connection status of each one of the plurality of hardware components;

a confidence level of a respective output of each one of the plurality of LECs;

consistency among respective outputs of the plurality of LECs and the plurality of NLECs;

a smoothness of a current trajectory traversed by the vehicle; and a spatial and temporal proximity of the vehicle to at least one object in a surrounding area.

18. A non-transitory computer-readable medium storing executable instructions for causing one or more computer processors to:

execute a first processing pipeline, including:

triggering control over a vehicle; and execute, in parallel to the first processing pipeline, a risk management processing pipeline, including:

acquiring first monitoring data from a first monitoring source used in the first processing pipeline;

acquiring second monitoring data from a second monitoring source used in the first processing pipeline;

generating a cumulative risk assessment value based on a combination of the first monitoring data and the second monitoring data;

in response to the cumulative risk assessment value being above a pre-determined main threshold, generating a warning notification;

in response to a frequency of occurrence of the generating the warning notification being above a pre-determined frequency threshold, triggering, independently from the first processing pipeline, a remedial action to be performed by the vehicle; and acquiring external factor data indicative of external factors;

generating, for at least one of the first and second monitoring data, a respective severity level based on the external factor data;

wherein the cumulative risk assessment value is generated based on the following:

$$R = \sum (F \times S),$$

wherein F is a respective frequency value of one of the first and second monitoring data exceeding a respective threshold value; and S is the respective severity level associated with the one of the first and second monitoring data.

19. The non-transitory computer-readable medium of claim 18, wherein a given one of the first and second monitoring sources comprises one of a hardware component of a plurality of hardware components, a learning-enabled component (LEC) of a plurality of LECs, and a non-learning-enabled component (NLEC) of a plurality of NLECs of the vehicle that are used in the first processing pipeline for controlling the vehicle.

20. The non-transitory computer-readable medium of claim 19, wherein the plurality of hardware components comprise a plurality of sensors of the vehicle and an electronic device communicatively coupled thereto, the plurality of sensors comprising:

a camera sensor;

a LIDAR sensor;

a RADAR sensor;

a Global Positioning System (GPS) sensor; and an Inertial Measurement Unit (IMU) sensor; and the electronic device comprising:

a processor;

a read-access memory (RAM); and a CAN-bus.

*    *    *    *    *